United States Patent [19]

Dirne et al.

[11] 3,950,947

[45] Apr. 20, 1976

[54] HOT-GAS MACHINE COMPRISING A HEAT TRANSFER DEVICE

[75] Inventors: Adrianus Petrus Dirne; George Albert Apolonia Asselman; Herman Henricus Maria Van Der, all of Eindhoven, Netherlands

[73] Assignee: U.S. Philips Corporation, New York, N.Y.

[22] Filed: Oct. 25, 1974

[21] Appl. No.: 517,967

Related U.S. Application Data

[63] Continuation of Ser. No. 285,476, Aug. 31, 1972, abandoned.

[30] Foreign Application Priority Data

Dec. 24, 1969 Netherlands .................. 6919338

[52] U.S. Cl. .................. 60/524; 165/96; 165/105

[51] Int. Cl. .................. F03g 7/06

[58] Field of Search .................. 165/32, 96, 105, 135; 60/524

[56] References Cited

UNITED STATES PATENTS

| | | | |
|---|---|---|---|
| 3,450,196 | 6/1969 | Bauer | 165/135 X |
| 3,502,138 | 3/1970 | Shlosinger | 165/105 X |
| 3,613,773 | 10/1971 | Hall et al. | 165/105 X |
| 3,621,906 | 11/1971 | Leffert | 165/105 X |
| 3,672,443 | 6/1972 | Bienert et al. | 165/105 X |

*Primary Examiner*—Albert W. Davis, Jr.
*Attorney, Agent, or Firm*—Frank R. Trifari; J. David Dainow

[57] ABSTRACT

A hot-gas engine including a heater and a source of heat in combination with a switching device for conveying heat from the heat source to heater, the device including a pair of spaced heat pipes with third intermediate heat pipe and means for introducing inert gas into said third heat pipe and removing said gas to vary the vaporization point therein and the rate of heat transfer therethrough.

3 Claims, 7 Drawing Figures

HOT-GAS MACHINE COMPRISING A HEAT TRANSFER DEVICE

This is a continuation, of application Ser. No. 285,476, filed Aug. 31, 1972.

BACKGROUND OF THE INVENTION

The invention relates to a hot-gas machine, for example, a hot-gas reciprocating engine or a hot-gas turbine, in which a gaseous medium performs a closed thermodynamic cycle. The machine includes a heater in which the cyclic medium receives heat from the outside from a source of heat; particularly a heat accumulator, a heat transfer device is provided between the heat source and the heater, said device containing a heat transporting medium which absorbs heat from the heat source while changing over from the liquid phase to the vapour phase, and giving off heat to the heater while changing-over from the vapour phase into the liquid phase. A machine of this kind is known from Dutch Patent Specification No. 58,355.

The heat transfer device may serve various purposes. It may be advantageous for reasons of space to arrange the heat source at a distance from the heater; for example, in vehicles may be equipped with a thermodynamic engine, in which the heat is furnished by a re-chargeable heat accumulator arranged elsewhere in the vehicle. The nature of the heat source may involve the desirability or necessity to dispose the machine at a distance from said source, for example, when the heat is supplied from a nuclear reactor, and when the machine has to be protected from the dangers of the radiation released by the nuclear reactions and the like. It may furthermore be advantageous to use that transfer device for establishing a thermal contact between the heaters of a number of thermodynamic machines or the various heaters of a multi-cylinder thermodynamic engine and one and the same common heat source.

In the above-mentioned cases, practice gives rise to a problem: the interruption of the heat transfer from the heat source to the heater. If, for example, a plurality of heaters of one or more machines communicate through separate heat transfer devices with the same heat source, and if the heat transport to one of said heaters has to be interrupted, for examplem because the machine is stopped or because the power of a multi-cylinder thermodynamic engine is reduced by putting a cylinder out of operation, the heat supply from the heat source to the further machines or cylinders has to be continued. It is then not allowed to arrest the production of heat by the heat source, if this is possible, nor is it allowed to remove the heat source. The latter encounters frequent practical difficulties, particularly when the heat source is a heat accumulator forming an integral part of the heat transfer device.

The heat transfer device usually forms part of the machine, so that interruption of the heat transport by removal of the heat transfer device would require a time-consuming dismounting operation, the more difficult on account of the high heater temperatures, which may exceed 700° C in thermodynamiic engines. FInally also turning away and/or displacing of the heat transfer device in conjunction or not in conjunction with the machine with respect to the heat source are attended by great practical inconveniences.

SUMMARY OF THE INVENTION

The present invention has for its object to provide a hot-gas machine comprising a heat transfer device, in which the heat transport from the heat source to the heater can be interrupted in a simple, rapid manner.

The hot-gas machine in accordance with the invention is characterized in that the heat transfer device comprises at least two closed spaces containing a heat transporting medium and arranged one after the other in the direction of heat transport, the distal ends of these spaces are provided with heat-passing walls through which heat from the heat source can be conducted to the transporting medium, or the latter can give off heat to the heater, the proximal ends of said spaces having further heat-passing walls between which a switching element is provided for establishing a thermal contact between said further walls.

In this way a machine is obtained in which the heat transfer from the heat source to the heater can be interrupted simply by actuating the switching element.

If the place of condensation of a space is located at a higher level than the place of evaporation, the return of condensate from the condensation place to the evaporation place may be performed under the action of the force of gravity. If this is not the case, each space of an advantageous embodiment of the machine in accordance with the invention may comprise a porous mass of material which connects the heat passing wall with the further heat-passing wall. By the capillary action of this mass of material, the reflow of condensate may then also take place without contribution of the force of gravity and even against the force of gravity. This means a great independence of position of the machine comprising a heat transfer device.

In a further advantageous machine embodying the invention the switching element is formed by a reservoir having two heat-passing reservoir walls which are each in contact with a further heat-passing wall or are also formed by a further heat-passing wall, the reservoir containing a heat transporting medium of variable pressure and/or quantity.

The heat transporting medium in the reservoir may be formed by a liquid which always remains in the same state of aggregation. A decrease of the quantity of liquid in the reservoir results in a decrease of the flow of heat between the two heat-passing walls of the reservoir. The heat transfer is blocked, when the whole quantity of liquid is removed from the reservoir.

A further advantageous machine embodying the invention is characterized in that the heat transporting-medium in the reservoir conducts heat from a hot heat-passing wall to a cold one of the reservoir while the liquid changes over to the vapour phase when heat is absorbed from the hot heat-passing wall and the vapour changes over to the liquid phase when heat is given off to the cold heat-passing wall; there is provided an auxiliary reservoir having portions serving as a liquid space and as a vapour space respectively and being in open communication with the reservoir through a vapour duct connected with the vapour space; the auxiliary reservoir is capable of absorbing cold from a cold source for condensing and/or solidifying the transporting-medium in the liquid space and of absorbing heat from a heat source for melting and/or evaporating the transporting-medium in said liquid space. In operation of the machine, only vapourous transporting-medium can flow from the reservoir to the auxiliary reservoir or conversely. Transporting-medium condensed or solidified in the auxiliary reservoir is retained therein and is therefore no longer available for the heat transfer between the two heat passing walls of the reservoir. By storing a greater or smaller quantity of transporting-medium in the liquid phase and/or solid phase in the auxiliary reservoir, a smaller or greater heat transfer will occur from the hot reservoir heat passing wall to the cold heat-passing wall of the reservoir.

Apart therefrom it is possible by increasing the pressure in the reservoir, for example, by admitting an inert, compressed gas into the reservoir, to raise the boilin͜ point of the heat-transporting medium so that the increased boiling point exceeds the operational temperature of the hot heat-passing wall of the reservoir. The transporting-medium is then no longer evaporated and the heat transfer between the heat-passing walls of the reservoir is arrested.

According to the invention the aforesaid auxiliary reservoir may be in open communication with the reservoir also through a liquid duct connected with the liquid space of the auxiliary reservoir for passing transporting-medium from the auxiliary reservoir to the reservoir; this liquid duct includes liquid trap adapted to be cooled, in which liquid transporting medium can be solidified for closing the liquid duct. This provides the advantage that transporting-medium to be conducted back from the auxiliary reservoir to the reservoir need not be first evaporated, but can flow back in the liquid phase. BY freezing the liquid trap the flow of liquid can be arrested so that the whole quantity of transporting medium condensed or solidified in the auxiliary reservoir is kept therein.

In an advantageous machine embodying the invention the liquid trap is formed by at least a portion of the liquid duct comprising a porous filling mass.

A further advantageous machine embodying the invention is characterized in that the reservoir comprises a porous mass of material, which interconnects the heat passing walls of the reservoir. If the heat transport in the reservoir is carried out by an evaporation-condensation process between the two heat passing walls of the reservoir, the transporting-medium condensed on the colder wall can readily be conducted back to the hotter wall without the action of gravity or against gravity by the capillary action of the suitably chosen porous mass of material. According to the invention the reservoir may accommodate radiation screens for preventing heat transfer by radiation between the heat passing walls of the reservoir.

The invention furthermore relates to a heat transfer device of the kind set forth. Although the transfer device is particularly suitable for use in thermodynamic engines, its use is not restricted thereto. The invention will be described more fully with reference to the drawing, which shows a few embodiments schematically not to scale.

FIGS.. 4 and 5 show a hot-gas engine in which the reservoir serving as a switching element comprises a medium transporting heat by means of an evaporation-condensation process, which medium can be withdrawn holly or partly from the reservoir and be stored in an auxiliary reservoir communicating therewith.

Figures 5, 6A, 6B:
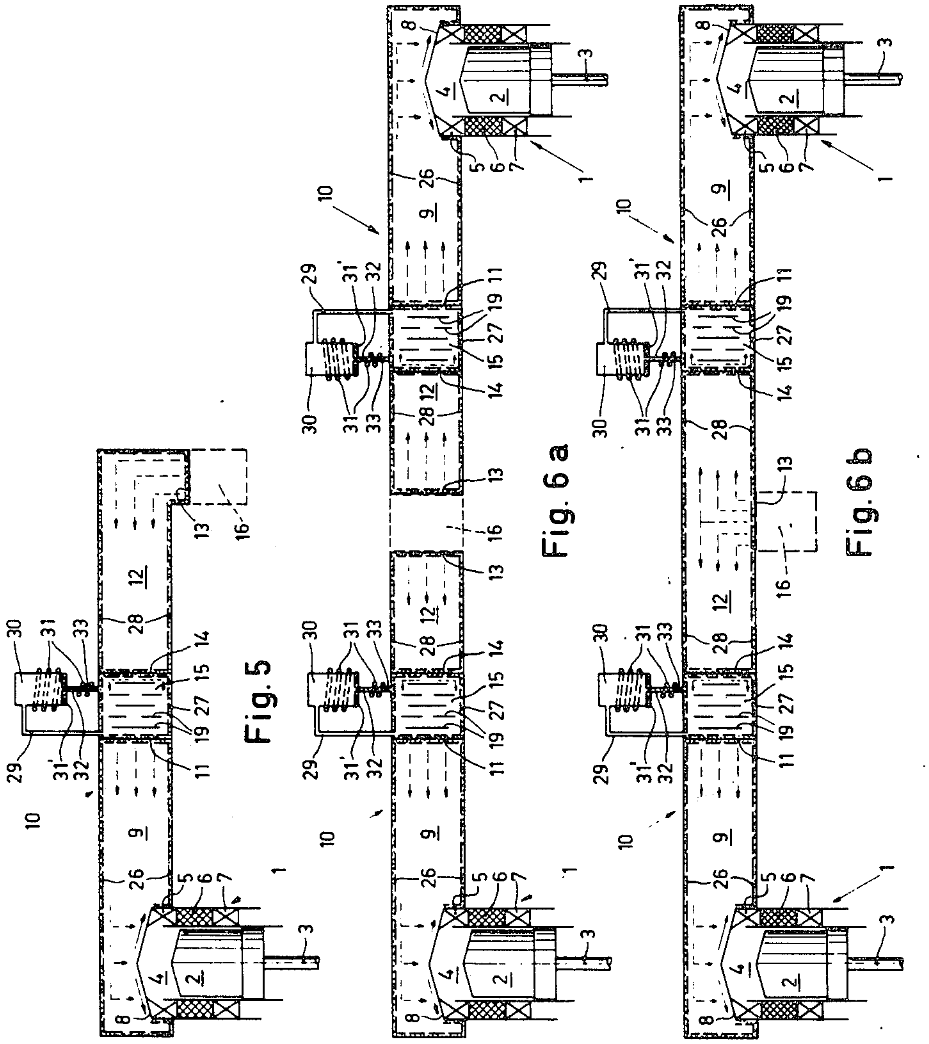

FIGS. 6*a* and 6*b* each show two hot-gas engines communicating each via a heat transfer device with a common heat source; each transfer device comprises as a switching element a reservoir in which a medium is contained which transports heat by means of an evaporation-condensation process and which medium can be stored wholly or partly in an auxiliary reservoir.

DESCRIPTION OF THE PREFERRED EMBODIMENT

Figure 1:
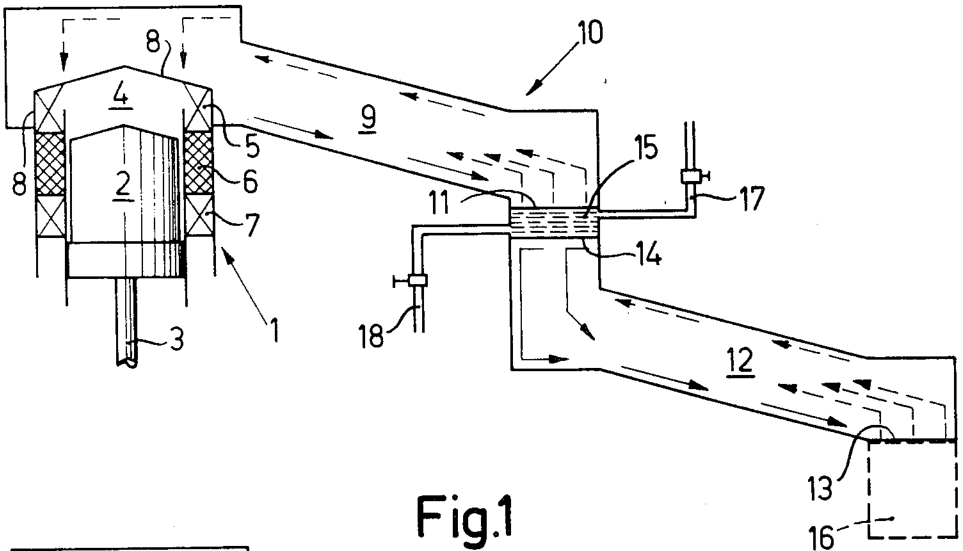
FIG. 1 shows a hot-gas engine comprising a heat transfer device, in which the switching element is formed by a liquid layer in a reservoir between the two spaces.

Referring to FIG. 1, reference numeral 1 designates the cylinder of a hot-gas engine in that part in which in operation the cyclic medium is constantly at a high temperature. The cylinder comprises a displacer 2 which is capable of displacing hot cyclic medium from the expansion space 4 towards the cold side of the engine by moving upwardly and by means of a driving gear (not shown) connected with the displacer rod 3. The cyclic medium passes through a heater 5, a regenerator 6 and a cooler 7. Heat can be supplied from without through the wall of the heater 5 to the cyclic medium in the expansion space 4. The wall of the heater 5 forms a heat passing wall 8 of a closed space 9, which forms part of a heat transfer device 10. The space 9 has furthermore a further heat passing wall 11 and is otherwise thermally isolated from the surroundings.

The heat transfer device 10 comprises furthermore a closed space 12 comprising on the one hand a heat passing wall 13 and on the other hand a further heat passing wall 14, and being otherwise thermally isolated from the surroundings. The further heat passing walls 11 and 14 form, in addition, heat passing walls of a reservoir 15, which is otherwise thermally isolated from the surroundings. The term "heat passing wall" has to denote a wall having low thermal resistivity. These are not only walls of material of high thermal conductivity but also walls of materials of lower thermal conductivity, provided the thickness of the wall is sufficiently small.

The further heat passing wall 13 of the space 12 is in thermal contact with a heat source 16 of high temperature, which may be a heat accumulator storing latent heat and/or sensible heat. The heat accumulator may be secured to the heat passing wall 13 or it may be arranged separately therefrom. As an alternative, the heat accumulator may be arranged inside the space 12; it has then to be possible to recharge the heat accumulator after use. The spaces 9 and 12 are both filled partly with a suitably chosen quantity of liquid transporting medium, which can evaporate at the temperature level of the heat source.

With a view to the high temperatures (about 700° C) of the heater of the hot-gas engine, suitable transporting media are, for example, the metals sodium, potassium, lithium, cadmium, cesium, metal salts such as the metalogenes, zinc chloride, aluminium bromide, cadmium iodide, calcium iodide, zinc bromide or mixtures thereof. Suitable for use are furthermore nitrates, nitrites or mixtures thereof.

The reservoir 15 contains a liquid which forms a thermal connection between the further heat passing walls 11 and 14. In the operation of the hot-gas engine the liquid layer remains in the liquid phase. It may be chosen in accordance with the choice of the transporting medium in the spaces 9 and 12 determined by the temperature of the heater or the heat source.

A liquid inlet 17 and a liquid outlet 18 communicate with the reservoir 15. The thermal expansion of the small quantity of liquid in the reservoir 15 may be compensated for by connecting an expansion vessel with the liquid inlet 17, which is not shown in the drawing.

The device operates as follows: The heat source 16 supplies heat through the heat passing wall 13 to the liquid transporting medium inside the space 12 on said wall. This transporting medium evaporates and moves to the further heat passing wall 14 owing to the locally prevailing low vapour pressure as a result of the comparatively low local temperature. The movement of the vapour is indicated by broken arrow lines. The vapour then condenses on the further heat passing wall 14, while giving off evaporation heat to said wall. Under the action of gravity the condensate flows back to the heat passing wall 13, where it is again evaporated. The flow of the condensate is indicated by full arrows. The heat absorbed by the further heat passing wall 14 passes through the liquid layer in the reservoir 15 and through the further heat passing wall 11 to the space 9 and causes evaporation of liquid transporting medium contained inside said space on the further heat passing wall 11. The evaporation-condensation process performed inside the space 9 is identical to that in the space 12. The evaporation heat released by the condensation of transporting medium on the heat passing wall 8 passes through said wall to the cyclic medium in the expansion space 4 in order to compensate for the caloric energy converted into mechanical energy during the expansion of the cyclic medium and also in order to compensate for the normal caloric losses.

If the heat transport from the heat source 16 to the heater 5 has to be interrupted, for example, for stopping the engine, this can be carried out in a simple manner by removing the liquid from the reservoir 15 via the liquid outlet 18 and, if necessary, by further exhausting the reservoir 15. Even if the heat source 16 continues supplying heat, for example, if it is a heat accumulator, the supplied heat cannot attain the heater 5. The sole consequence is that an evaporation-condensation process is performed only inside the space 12 until the vapour pressure in the portion of the space 12 adjacent the further heat passing wall 14 is equal to the vapour pressure at the heat passing wall 13, the latter being determined by the temperature of the heat source 16. As a matter of course, the space 12 has to be structurally formed sc that its walls can withstand the potential maximum vapour pressure.

In the device shown in FIG. 1 a small quantity of heat will always leak from space 12 to space 9 due to thermal radiation from the further heat passage wall 14 to the further heat passage wall 11. This may, in general, be prevented by arranging radiation screens in the reservoir, which screens block the passage of thermal radiation.

Figure 2:
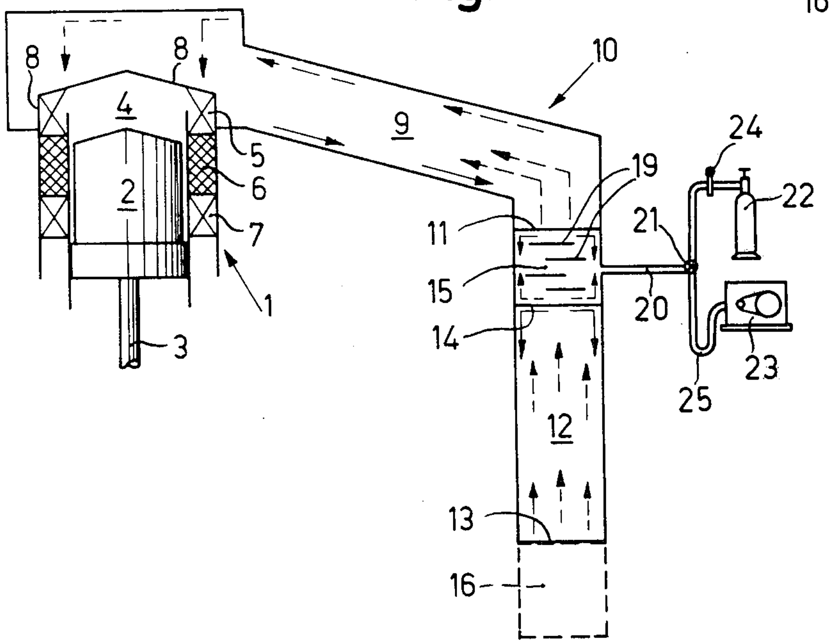
FIGS. 2 and 3 show hot-gas engines, in which the reservoir serving as a switching element comprises a medium which transports heat by means of an evaporation-condensation process, the pressure of said medium being variable by the supply or outlet of an inert gas in the reservoir.

In the device shown in FIG. 2 corresponding parts are designated by the same reference numerals as in FIG. 1. The reservoir 15 accommodates radiation sceens 19, which prevent the radiation heat from the further heat passing wall 14 from reaching the further heat passing wall 11. The reservoir 15 is partly filled with liquid transporting medium.

The operation of this device differs from that of FIG. 1 only to an extent such that in operation heat supplied by the further heat passing wall 14 to the reservoir 15 produces evaporation of liquid transporting medium in said reservoir. The resultant vapour moves towards the region of low vapour pressure, that is to say, near the comparatively cold further heat passing wall 11. It condenses on said wall while giving off the released condensation heat and under the action of the gravity component it flows along the slope of the reservoir as a liquid back to the further heat passing wall 14, where the liquid evaporates again, A duct 20 communicates with the reservoir and includes a cook 21, which is adapted to establish a communication between the reservoir 15 and either the gas cylinder 22 containing a compressed inert gas or a pumping device 23. Between the cock 21 and the gas cylinder 22 a pressure reducing valve 24 is provided and between the cock 21 and the pumping device 23 a vapour trap 25 is arranged for transporting medium.

If the heat transport from the heat source 16 to the heater 5 has to be interrupted, inert gas is suplied from the gas cylinder 22 to the reservoir 15. The pressure of the inert gas produces such an increase in the boiling point of the transporting medium in the reservoir 15 that the new boiling point exceeds the temperature of the further heat passing wall 14. The evaporation of liquid transporting medium in the reservoir is then stopped and hence also the heat transport from the further heat passing wall 14 to the further heat passing wall 11.

When the heat transport has to be restored, the reservoir 15 is communicated with the pumping device 23, which pumps away the inert gas from the reservoir 15. Any medium vapour carried along with the inert gas can condensate in the vapour trap 25 by cooling and be held therein.

Obviously all kinds of shapes and dispositions as, for example, those of FIG. 1, are possible provided it is ensured that condensate can flow back to the place of evaporation.

Figure 3:
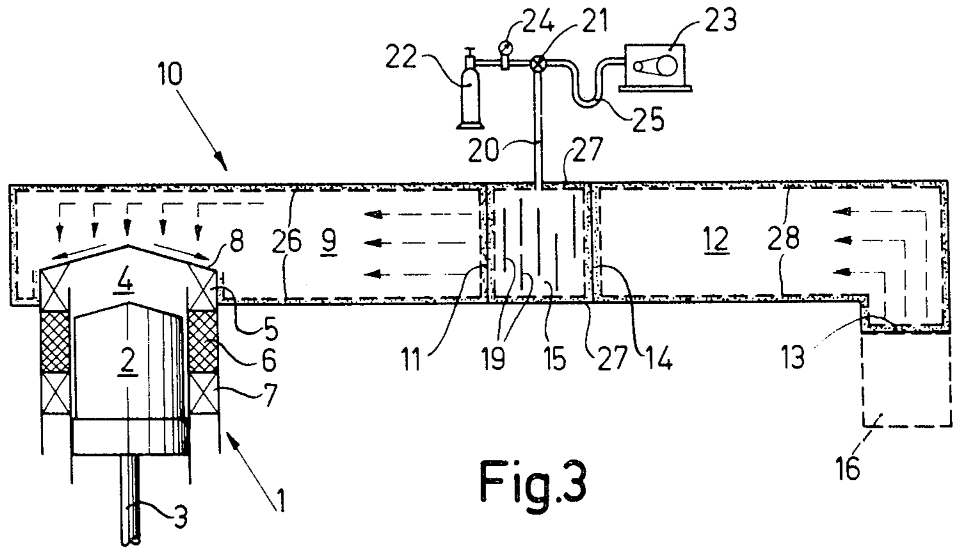

FIG. 3 shows a device which is substantially identical to that of FIG. 2. Corresponding parts are designated by the same reference numerals as in FIG. 2. The device shown in FIG. 3 differs essentially from that of FIG. 2 by the presence of porous masses of material 26, 27 and 28 on the inner walls of the space 9, the reservoir 15 and the space 12. These porous masses of material have such a capillary structure that by utiilizing the surface tension of the liquid transporting medium in the space or the reservoir respectively, in the given operational state of the space or the reservoir respectively, they are capable of conducting by capillary action the condensate formed on the comparatively cold heat passing wall, on the heat passing wall of the space or on the reservoir respectively back to the comparatively hot heat passing wall, the further heat passing wall of the space or the reservoir respectively.

In this way a flow-back of condensate is possible without using the force of gravity or in the absence of the gravitational acceleration, and even against this acceleration. This provides great freedom in the disposition of the hot-gas engine and in the disposition or construction of the various parts of the heat transfer device.

In the assembly of FIG. 3, in which the heat transfer device is arranged in a horizontal flow-back of condensate is performed in spite of the horizontal position. This is performed in space 12 by the absorption of condensate formed at the further heat passing wall 14 in the porous mass of material 28, which conveys the condensate by capillary effect to the heat passing wall 13.

In a similar manner condensate in reservoir 15 is conveyed from the further heat passing wall 11 to the further heat passing wall 14 via the porous mass of material 27 and in space 9 from the heat passing wall 8 to the further heat passing wall 11 via the porous mass of material 26.

The operation of the device shown in FIG. 3 is otherwise similar to that of FIG. 2 so that further description is dispensed with. The porous mass of material may be formed by ceramic material, by wire- or tape-shaped material of metal or metal alloys or by an array of tubes and the like. The choice depends for example upon the chosen heat transporting medium and on the prevailing temperatures in the operation of the device.

Figure 4:
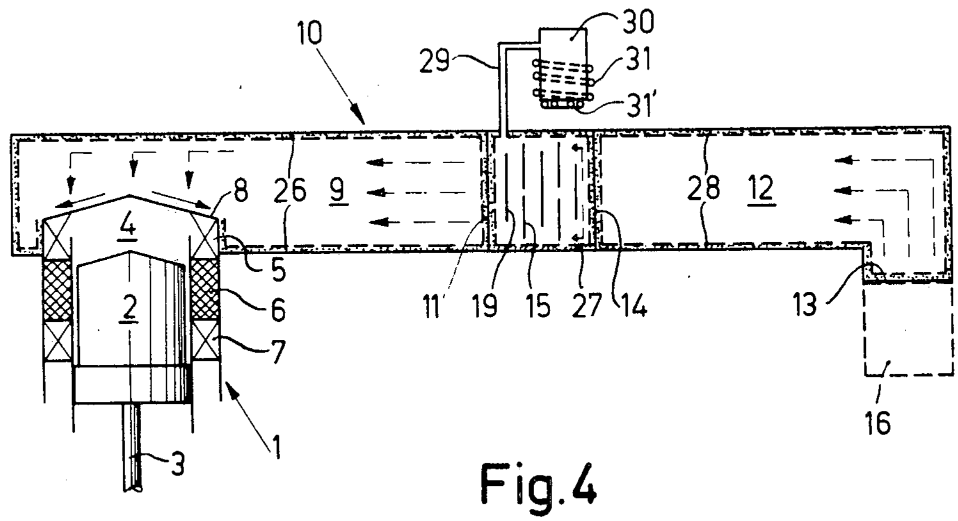

FIG. 4 shows a hot-gas engine comprising a heat transfer device between the heater and the heat source, the difference from that of FIG. 3 being that the reservoir 15 in the present case is in open communication through a vapour duct 29 with an auxiliary reservoir 30, in which a heating coil 31 and a cooling coil 31' are arranged. If the heat transfer between the heat source 16 and the heater 5 has to be interrupted, this is performed by cooling the auxiliary reservoir 30. Owing to the low temperature then prevailing in the auxiliary reservoir, transporting medium vapour will flow through the vapour duct 29 from the reservoir 15 to the auxiliary reservoir, in which it will condense or even solidify. It is thus possible to withdraw the whole quantity of medium from the reservoir 15 and to store it in the auxiliary reservoir 30. In the absence of medium in the reservoir 15 the heat transfer is blocked. If the heat transfer has to be restored, heat is conducted to the auxiliary reservoir 30, in this case by means of the heating coil 31, so that medium evaporates from the auxiliary reservoir 30 and flows back to the reservoir 15 via the vapour duct 29. In order to maintain the restored heat transfer, heat, be it a small value, has constantly to be supplied to the auxiliary reservoir 30 in order to avoid that the temperature and hence the vapour pressure inside the auxiliary reservoir 30 drop below those at the further heat passing wall 11. This might give rise to a flow of medium vapour from the further heat passing wall 14 to the auxiliary reservoir 30, in which it would condense instead of travelling on to the further heat passing wall 11, where it has to condense.

In the device shown in FIG. 4 medium condensed or solidified in the auxiliary reservoir 30 has first to be evaporated before the return to the reservoir 15 is possible and in operation the auxiliary reservoir 30 has to be kept hot.

This is contrary to the device shown in FIG. 5, which coarsely corresponds with that of FIG. 4, there being provided, however, a liquid duct 32 joining on the one hand that portion of the auxiliary reservoir 30 in which liquid or solidified medium can be stored and on the other hand the reservoir 15. The liquid duct 32 includes a porous filling mass 33, which contributes to the use of the liquid duct 32 in addition as a liquid trap. The liquid duct 32 can be cooled for this purpose and can be heated with the aid of the heating coil 31, which surrounds herein not only the auxiliary reservoir 30 but also the liquid duct 32.

In order to interrupt the heat transport between the heat source 16 and the heater 5 the auxiliary reservoir 30 and the liquid duct 32 are cooled. Then medium vapour is again conveyed from the reservoir 15 through the vapour duct 29 to the auxiliary reservoir 30. This vapour is condensed and solidified in the auxiliary reservoir. This operation continues until the reservoir 15 has become dry, so that the heat transfer in this reservoir is cut off.

By the capillary action of the porous filling mass 33 the liquid duct 32 is completely filled with liquid. It is thus avoided that medium vapour from the reservoir 15 penetrates into the liquid duct 32, which would render solidification impossible due to the high heat content of this vapour.

The porous filling mass 33 performs during the solidification process also the function of flow resistor, which ensures that liquid medium can pass only with comparatively low speed through the liquid duct 32 so that owing to this low speed solidification of liquid in the liquid duct 32 is additionally facilitated. The passage is then cut off so that the liquid medium can readily solidify in the auxiliary reservoir 30.

Even without porous filling mass it is possible to cause solidification of liquid in the liquid duct 32, for example, by constructing a portion of the liquid duct in the form of a bend, which is filled with liquid and cooled.

If the heat transfer has to be restored, the solid medium in the auxiliary reservoir 30 and the liquid duct 32 is melted with the aid of the heating coil 31. By the capillary action of the porous filling mass 33 and in this case also under the action of gravity liquid medium flows from the auxiliary reservoir 30 via the liquid duct 32 into the porous mass 27 of reservoir 15 and moves towards the further heat passing wall 14, where it is evaporated. The evaporation-condensation process inside the reservoir 15 and hence the heat transfer are thus restored. The further operation of this device is identical to that of the device shown in FIG. 4.

FIGS. **6*a* and 6*b* show assemblies in which two hot-gas engines communicate each via a heat transfer device with a single common heat source. Since the construction and the operation of the heat transfer devices of FIG. 6*a* are identical to those of the device of FIG. 5, a further description may be dispensed with. Corresponding parts are designated by the same reference numerals as in FIG. 5. The device shown permits in a simple manner of interrupting or restoring at will the heat transfer from the heat source 16 to the heater of a hot-gas engine or to the heater of the two hot-gas engines. This is particularly important when the heat source is formed by a heat accumulator, which supplies heat continuously to the spaces 12. By interrupting the heat transfer in a heat transfer device from the space 12 to the space 9 by means of the reservoir 15, a thermal equilibrium is established between the heat accumulator 16 and the space 12** concerned.

The device shown in FIG. **6*b* differs from that shown in FIG. 6a only to such an extent that the two heat transfer devices have a common space 12 having a single heat passing wall 13, through which heat from the heat source 16 can be supplied to the medium inside the space 12. At the heat passing wall 13 in the space 12 medium evaporates and flows in two directions towards the two further heat passing walls 14 of the space 12, where it condenses, while giving off its condensation heat. The condensate is conducted by the capillary action of the appropriately chosen porous mass of material 28 back to the heat passing wall 13, where it evaporates again. Interruption or restoration of the heat transfer from the heat source 16 to one or both heaters 8 are performed in the same manner as described with reference to FIG. 5**.

In the devices of the kind shown in FIGS. 4, 5 and 6 the switching element may also be a reservoir filled with a liquid forming a thermally conducting layer between the further heat passing walls 11 and 14. A regulation of the liquid level then results in a control of the heat passing surface and hence of the heat transfer. In the arrangement shown in the drawing the further heat passing walls of the spaces 9 and 12 also form the heat passing walls of the reservoir 15. Obviously, the reservoir may have its own heat passing walls, which are in contact with the further heat passing walls of the spaces 9 and 12.

What is claimed is:

1. In a hot-gas engine including a heater, the improvement in combination therewith of a heat transfer device for controlling transfer of heat from a heat source to said heater comprises two closed spaces which are first and second heat pipes containing first and second heat-transporting mediums respectively, and arranged one after the other in the direction of heat transport, the distal ends of which are provided with heat-passing walls through which heat from the heat source can be supplied to the first transporting medium and the second transporting medium can give off heat to the heater whereas the proximal ends of said spaces comprise further heat-passing walls, between which a switching element is provided for establishing a thermal contact between said further heat-passing walls, said switching element is a third heat pipe comprising a reservoir for containing a third heat transporting medium that is a vaporizable liquid, a quantity of said third medium in said reservoir, a source of inert gas, means for flowing said gas into and out of said reservoir and for controlling the quantity and pressure of said gas in said reservoir, whereby higher pressure gas raises the vaporization point of said third medium which reduces vaporization thereof, and consequently reduces heat transfer through said switching element.

2. A device according to claim 1, further comprising radiation screens in said transfer element intermediate said further heat-passing walls for preventing heat transfer by radiation between said walls.

3. In a hot-gas engine including a heater, the improvement in combination therewith of a heat transfer device for controlling transfer of heat from a heat source to said heater comprising means defining at least two closed spaces which operate as first and second heat pipes, heat-transporting medium in said spaces, these spaces positioned sequentially and thus having two remote distal ends and two adjacent, proximal ends, each of said ends comprising a heat-passing wall, whereby heat may be cyclically transmitted through one distal end-wall from the heat source to said first heat-transporting medium in said first space, which medium then changes from liquid to vapor phase, and through the other distal end wall of said second space from said second heat-transporting medium therein to said heater, when said second medium then changes from vapor to liquid phase, said device further comprising a switching element which is a third heat pipe situated between said proximal end-walls for establishing a thermal contact therebetween, said switching element comprising a reservoir for containing a third heat-transporting medium that is a vaporizable liquid, a quantity of said third medium in said reservoir, a source of inert gas, means for flowing said gas into and out of said reservoir and for controlling the quantity and pressure of said gas in said reservoir, whereby higher pressure gas raises the vaporization thereof, and consequently reduces heat transfer through said switching element.

* * * * *

UNITED STATES PATENT AND TRADEMARK OFFICE

CERTIFICATE OF CORRECTION

PATENT NO. : 3,950,947

DATED : April 20, 1976

INVENTOR(S) : ADRIANUS PETRUS DIRNE ET AL

It is certified that error appears in the above-identified patent and that said Letters Patent are hereby corrected as shown below:

Change the inventor's name from "HERMAN HENRICUS MARIA VAN DER"

to --HERMAN HENRICUS MARIA VAN DER AA--

Col. 3, line 24, after "includes" should be --a--

Col. 7, line 2, after "horizontal" should be --plane,--

Signed and Sealed this

Seventeenth Day of August 1976

[SEAL]

*Attest:*

RUTH C. MASON
*Attesting Officer*

C. MARSHALL DANN
*Commissioner of Patents and Trademarks*